US006639215B2

(12) United States Patent
Takada et al.

(10) Patent No.: US 6,639,215 B2
(45) Date of Patent: Oct. 28, 2003

(54) ION SOURCE AND MASS SPECTROMETER

(75) Inventors: Yasuaki Takada, Kiyose (JP); Masuyoshi Yamada, Ichikawa (JP); Masao Suga, Hachioji (JP); Yuichiro Hashimoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 57 days.

(21) Appl. No.: 10/053,567

(22) Filed: Jan. 24, 2002

(65) Prior Publication Data

US 2003/0015657 A1 Jan. 23, 2003

(30) Foreign Application Priority Data

Jul. 23, 2001 (JP) ...................................... 2001-221757

(51) Int. Cl.[7] ................................................ B01D 59/44
(52) U.S. Cl. ....................................................... 250/288
(58) Field of Search ................................ 250/281, 282, 250/288, 324, 326, 423 R, 424, 425

(56) References Cited

U.S. PATENT DOCUMENTS 5,969,351 A * 10/1999 Nabeshima et al. ........ 250/288

* cited by examiner

*Primary Examiner*—John R. Lee
*Assistant Examiner*—Christopher M. Kalivoda
(74) *Attorney, Agent, or Firm*—Mattingly, Stanger & Malur, P.C.

(57) ABSTRACT

To provide a mass spectrometer having a high sensitivity to dioxins. In the mass spectrometer including: a sample supply tube for supplying a sample solution containing a sample to be measured; a nebulizer for nebulizing the sample solution supplied from the sample supply tube; an ion source having a needle electrode for ionizing the sample nebulized and vaporized in the nebulizer; and a mass analyzer for analyzing ions formed in the ion source, and a gas of a flow rate corresponding to the flow rate of the sample solution is mixed to the vaporized sample, and a moving direction of the sample is made opposite to a moving direction of ions at a tip of the needle electrode.

12 Claims, 10 Drawing Sheets

ION SOURCE AND MASS SPECTROMETER

BACKGROUND OF THE INVENTION

1. Field of the Invention

The present invention relates to a field of chemical analysis, and more specifically to a mass spectrometer that uses atmospheric pressure chemical ionization.

2. Description of the Prior Art

Pollution by dioxins has become a serious social issue, and various measures have been taken. In particular, since the major source of dioxins newly released in environment is waste incinerators, monitoring of exhaust gas from incinerators has been intensified.

In a conventional method of measuring dioxin contained in the exhaust gas from incinerators, quantitative analyses are performed for each isomer using high-resolution gas chromatograph/mass spectrometer (hereafter abbreviated as GC/MS) after complicated pre-treatments. This is because the toxicity of dioxins differs depending on isomers. The resulting measurements are converted to the weight of 2,3,7,8-tetrachlorodibenzo-p-dioxin, and recorded as a toxicity equivalent quantity (hereafter abbreviated as TEQ). Although this method enables accurate measurement, it is the present situation that the analysis requires much labor, and that it takes nearly one month before the result is obtained. The cost for the analysis of one sample is as high as about ¥300,000.

The reason why the complicated pre-treatment is required in the conventional technique is the use of electron impact (hereafter abbreviated as EI) as the ion source of the mass spectrometer. EI is a method of forming ions by the impact of electrons by radiating electron beams on a sample substance, and is a general-purpose ionizing method. On the other hand EI causes the decomposition of molecules easily, and if a plurality of substances reach the ion source at the same time, the mass spectra become complicated, and may cause erroneous measurements. Therefore, complicated operations are required to remove impurities and separate every each component.

As described above, since the precision analysis of dioxins requires much labor and cost, frequent analyses are difficult. Therefore, the exhaust gas from a waste incinerator is analyzed twice a year. In each analysis, sampling is performed for 4 hours. However, the quantity of dioxins in exhaust gas is significantly depends on combustion conditions, analyses performed twice a year do not always determine the quantity of dioxins released from the incinerator for a long period of time.

In order to estimate the quantity of dioxins more easily, other indices that correlates the quantity of dioxins, for example a quick measurement of the concentration of chlorophenols or chlorobenzenes considered to be dioxin precursors, have been studied. This is the effort to decrease the quantity of produced dioxins by estimating the quantity of dioxins contained in exhaust gas from the measurement of dioxin precursors, and feeding back the estimated value to the combustion controller. However, since the quantity of dioxin precursors in exhaust gas is $10^3$ to $10^4$ times the quantity of dioxins, the correlation between the concentration of precursors and the concentration of dioxin is not sufficiently high.

Therefore, the present inventors noticed the total quantity of dioxins, which has a high correlation to TQC, and started the development of a system for monitoring the quantity of dioxins released from incinerators in environment for a long period of time by easily measuring the total quantity of dioxins. The object of the present invention is to provide a mass spectrometer favorably used for measuring the total quantity of dioxins.

SUMMARY OF THE INVENTION

The present invention provides a mass spectrometer having a high sensitivity, including a sample supply tube for supplying a sample solution containing a sample to be measured, a nebulizer for nebulizing the sample solution supplied from the sample supply tube, an ion source including a needle electrode for ionizing the sample nebulized and vaporized in the nebulizer, and a mass analyzer for analyzing ions formed in the ion source by mixing a carrier gas with the nebulized sample or the sample vaporized by the vaporizer to supply the mixed sample to the ion source. The present invention also provides a mass spectrometer suitable for measuring the total quantity of dioxins, wherein the moving direction of the sample is made opposite to the moving direction of ions at the tip of the needle electrode.

An ion source and a mass spectrometer of the present invention have the following features:

(1) An ion source including: a nebulizer for nebulizing a sample solution; a vaporizer for vaporizing the sample nebulized by the nebulizer; a gas mixer for mixing a carrier gas with the sample nebulized by the nebulizer or vaporized by the vaporizer; and a discharge chamber having a gas entrance and a gas exit through which the carrier-gas mixed sample flows in and flows out, a needle electrode that generates corona discharge, and an aperture for taking out the ionized sample.

(2) The ion source according to the above-described (1), further including a mixing rate controller for controlling the flow rate of the sample solution supplied to the nebulizer, and the mixing rate of the carrier gas supplied to the gas mixer.

(3) The ion source according to the above-described (2), wherein the mixing rate controller controls (the flow rate of the carrier gas)/(the flow rate of the sample solution) to a predetermined value between 2,500 and 15,000.

(4) The ion source according to the above-described (2), wherein the mixing rate controller controls (the flow rate of the carrier gas)/(the flow rate of the sample solution) to a predetermined value between 5,000 and 8,000.

(5) The ion source according to the above-described (1), wherein the gas entrance of the discharge chamber is also used as an aperture for taking out the ionized sample.

(6) The ion source according to the above-described (1), further including a flow path for bypassing through the discharge chamber a part of the carrier-gas mixed sample supplied from the gas mixer.

(7) A mass spectrometer including: a nebulizer for nebulizing a sample solution; a vaporizer for vaporizing the sample nebulized by the nebulizer; a mixer for mixing a carrier gas with the sample nebulized by the nebulizer or vaporized by the vaporizer; a discharge chamber having a gas entrance and a gas exit through which the carrier-gas mixed sample flows in and flows out, a needle electrode that generates corona discharge therein, and an aperture for taking out the ionized sample; and a mass analyzer wherein ions taken out of the aperture in the discharge chamber are introduced.

(8) The mass spectrometer according to the above-described (7), further including a mixing rate controller for controlling the flow rate of the sample solution supplied to the nebulizer, and the mixing rate of the carrier gas supplied to the gas mixer.

(9) The mass spectrometer according to the above-described (8), wherein the mixing rate controller controls (the flow rate of the carrier gas)/(the flow rate of the sample solution) to a predetermined value between 2,500 and 25,000.

(10) The mass spectrometer according to the above-described (8), wherein the mixing rate controller controls (the flow rate of the carrier gas)/(the flow rate of the sample solution) to a predetermined value between 5,000 and 8,000.

(11) The mass spectrometer according to the above-described (7), wherein the gas entrance of the discharge chamber is also used as an aperture for taking out the ionized sample.

(12) The mass spectrometer according to the above-described (7), further comprising a flow path for bypassing through the discharge chamber a part of the carrier-gas mixed sample supplied from the gas mixer.

DETAILED DESCRIPTION OF THE PREFERRED EMBODIMENTS

Figure 1:
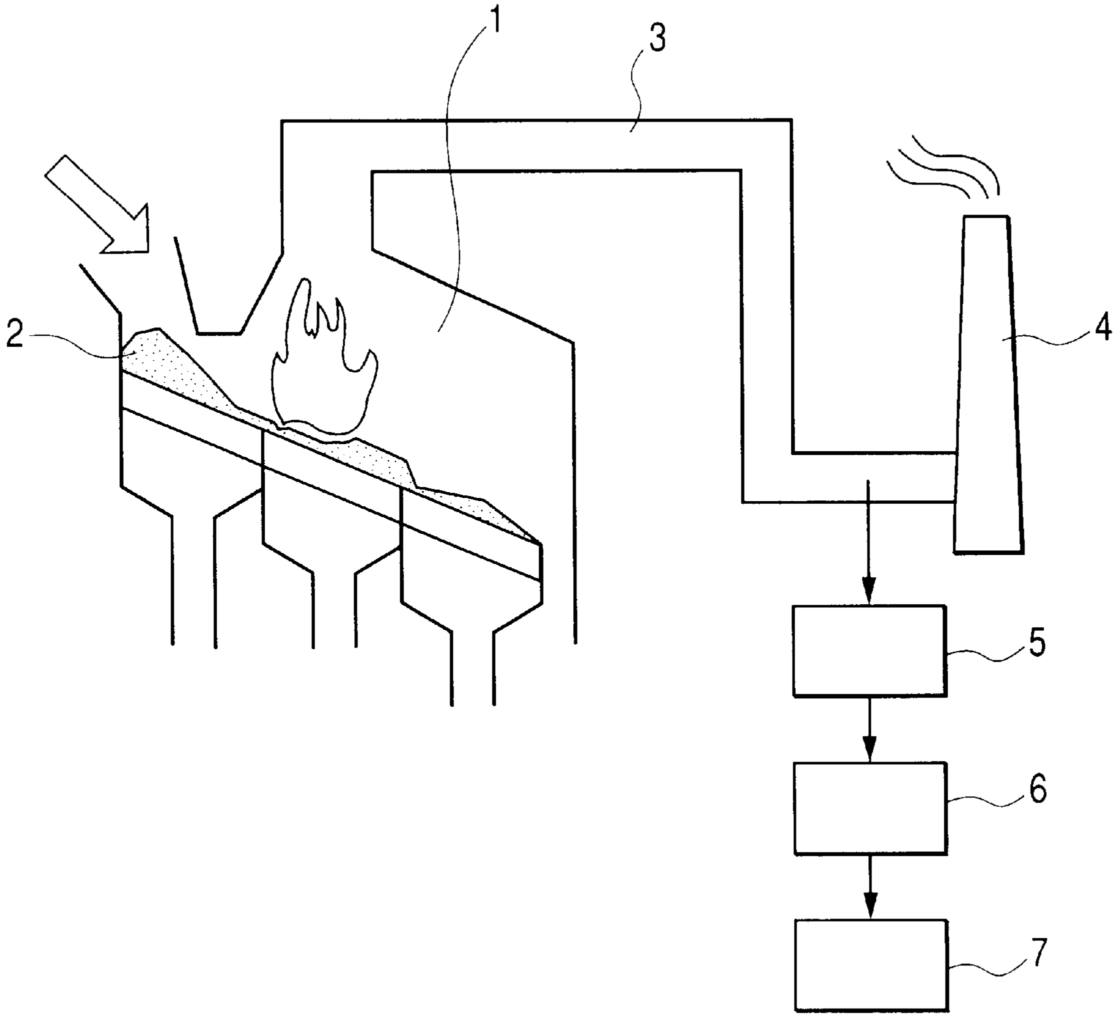
FIG. 1 is a diagram showing an overall system of the present invention.

The embodiments of the present invention will be described in detail below referring to the drawings. In the following drawings, the parts having the same of similar functions are denoted by the same reference numerals, and duplicated descriptions will be omitted.

FIG. 1 is a diagram showing an overall system according to the present invention. In an incinerator 1, exhaust gas produced by an incineration of waste 2 is exhausted through a flue 3 from a chimneystack 4. Exhaust gas is collected from the flue 3 or the chimneystack 4, and introduced in a collector 5. An adsorber is disposed in the collector 5, and the components of the exhaust gas, such as dioxins, are adsorbed by the adsorber. Next, in a pre-treatment chamber 6, the components adsorbed by the adsorber are extracted and concentrated. An organic solvent is used for extraction and concentration in the pre-treatment chamber 6. The solution wherein dioxins are dissolved is introduced into a mass spectrometer 7 for analyzing.

Figure 2:
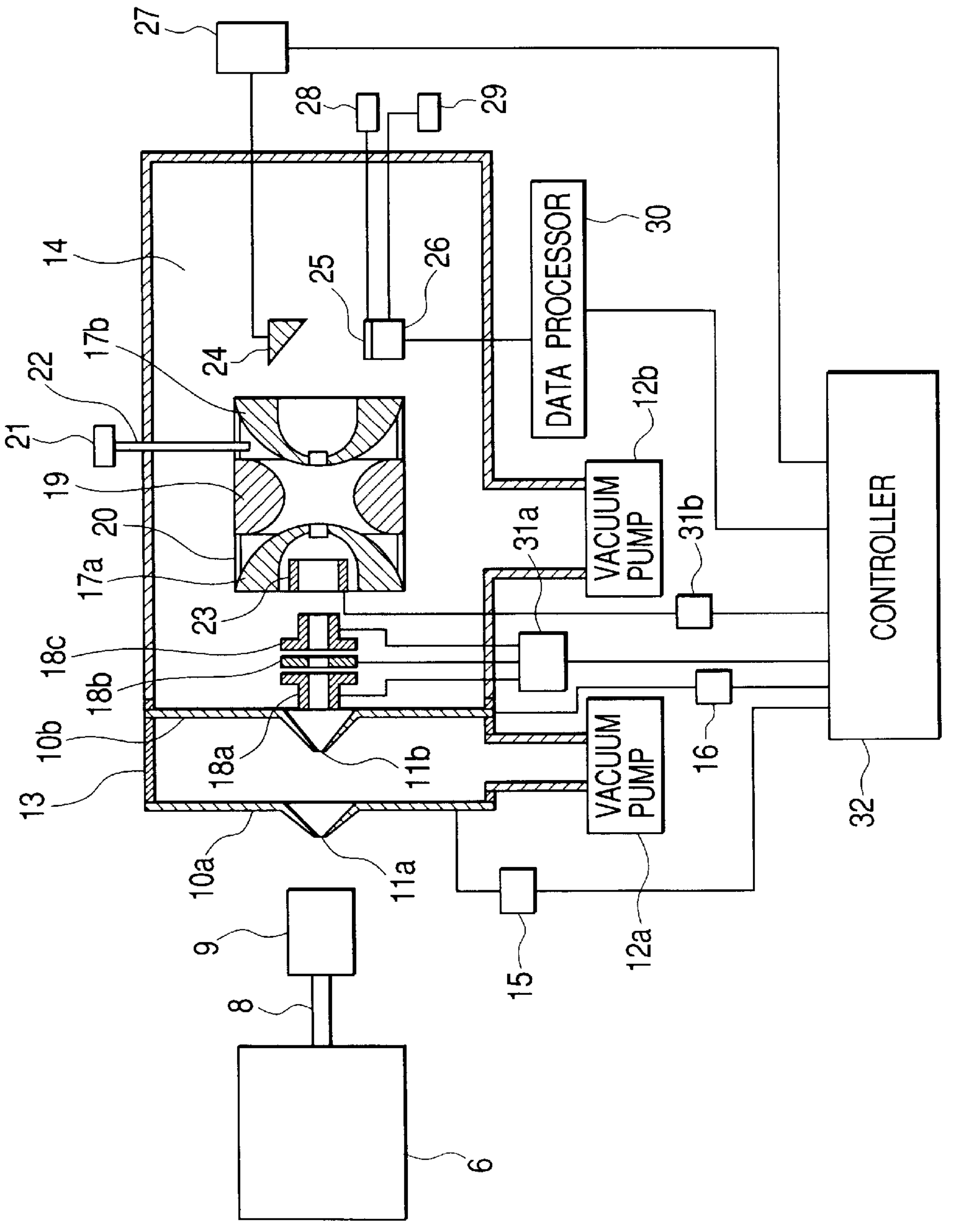
FIG. 2 is a diagram showing a configuration of a mass spectrometer according to the present invention.

FIG. 2 is a diagram schematically showing a mass spectrometer, and as a typical example, a mass spectrometer having an ion-trap mass analyzer will be described. The sample solution produced in a pretreatment region 6 is transferred through a pipe 8 to an ion source 9. Ions formed from the ion source 9 are passed through a first ion introducing aperture 11*a* opened in an electrode 10*a* with an aperture, a differential pumping region 13 ventilated by a vacuum pump 12*a*, and a second ion introducing aperture 11*b* opened in an electrode 10*b* with an aperture, into a vacuum region 14 evacuated by a second vacuum pump 12*b*. A voltage is impressed to the electrodes with apertures 10*a* and 10*b* by a drift voltage source 15. The drift voltage has an effect of improving the ion transmission of the ion introducing aperture 11*b* by drifting ions taken in the differential pumping region 13 toward the second ion introducing aperture 11*b*, as well as the effect of separating the molecules of the solvent water such as water adhered to ions by making gas molecules remaining in the differential pumping region 13 collide to ions. An acceleration voltage is impressed to the electrode 10*b* with the aperture from the acceleration voltage source 16. This acceleration voltage affects the energy (incidental energy) when ions pass through the opening provided in an end-gap electrode 17*a*. Since the ion trapping efficiency of the ion-trap mass analyzer depends on the incidental energy of the ions, the acceleration voltage is set so as to increase the trapping efficiency.

The ions introduced in the vacuum region 14 are converged by an ion converging lens composed of electrodes 18*a*, 18*b*, and 18*c*, and then introduced into the ion-trap mass analyzer composed of end-cap electrodes 17*a*, 17*b*, and a ring electrode 19. A quartz ring 20 holds the end-cap electrodes 17*a*, 17*b*, and ring electrode 19. A collision gas, such as helium, is introduced into the mass analyzer from a gas supplier 21 through a gas-introducing pipe 22. A gate electrode 23 is provided to control the timing for the incident of ions to the ion-trap mass analyzer. The ions mass-analyzed and discharged out of the mass analyzer is detected by a detector composed of a conversion electrode 24, a scintillator 25, and a photo-multiplier 26. The ions collide to the conversion electrode 24 impressed by a voltage for accelerating the ions from a converting voltage source 27. The collision of ions to the conversion electrode 24 causes the release of charged particles from the surface of the conversion electrode 24. The scintillator 25 detects these charged particles, and the signals are amplified by a photo-multiplier 26. The scintillator 25 and the photo-multiplier 26 are connected to a scintillator power source 28 and a photo-multiplier power source 29, respectively. The detected signals are transmitted to a data processor 30. The ion converging lens and the gate electrode are also connected to power sources 31*a* and 31*b*, respectively. A controller 32 controls the entire system.

Figure 3:
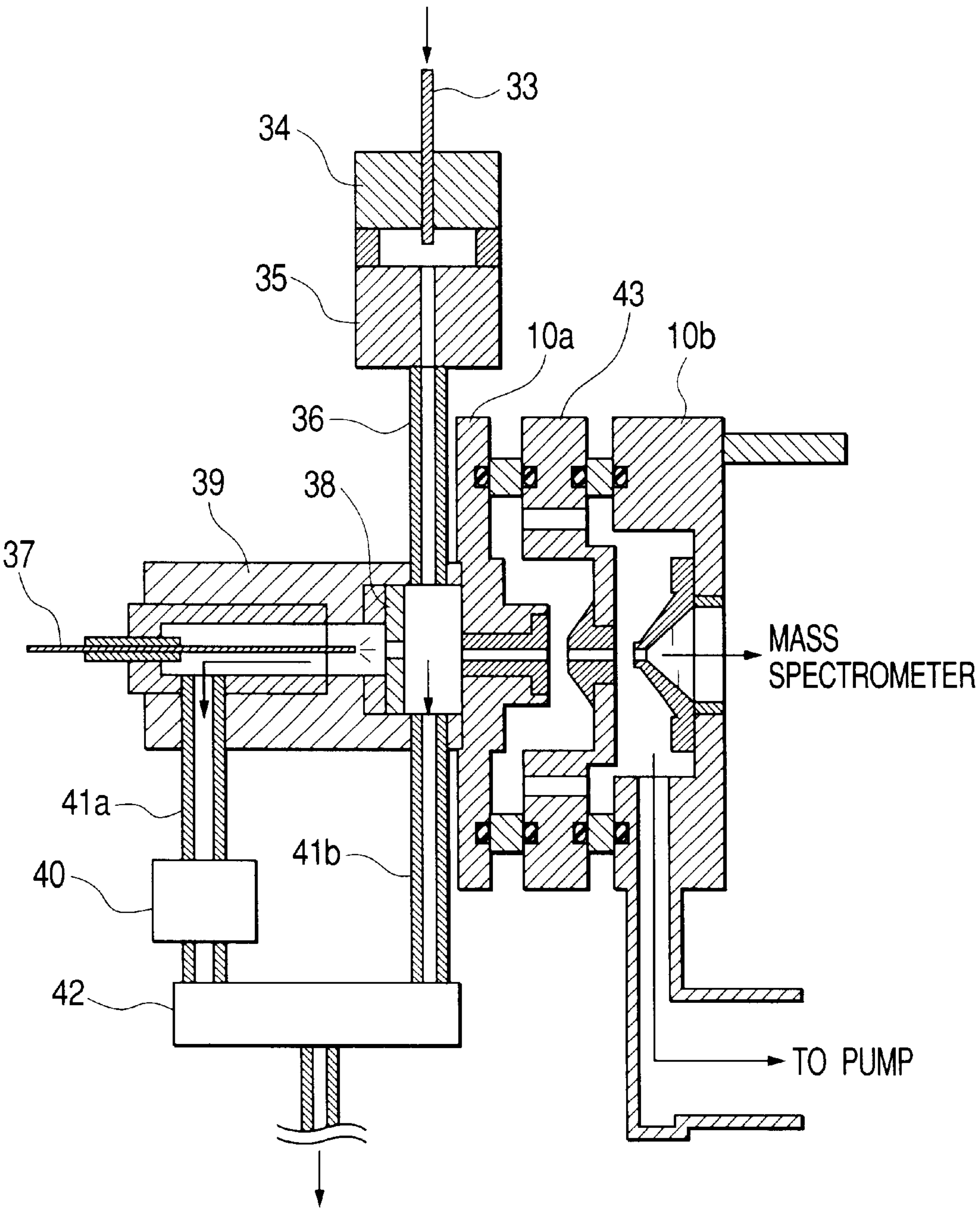
FIG. 3 is a diagram showing a configuration of an ion source according to the present invention.

FIG. 3 is a diagram showing a structure of the ion source according to the present invention. The sample solution from the pre-treatment section is introduced in a metal pipe (sample supply tube) 33. The metal pipe 33 is buried in a metal block 34. A heater and a thermocouple (both not shown) are installed on the metal block 34, and the metal block 34 is heated to about 200° C. The sample solution is sprayed by heat from the end of the metal pipe 33. The sprayed sample solution is further introduced in a separate vaporizing block 35. The vaporizing block 35 is also heated, and the droplets formed by spraying is vaporized by heat. The vaporized sample is transferred to the ion source through a heated pipe 36 in order to prevent the adsorption on the wall.

A needle electrode 37 is disposed on the ion source, and a high voltage is impressed between the needle electrode 37 and a facing electrode 38. Corona discharge occurs in the vicinity of the tip of the needle electrode 37, and nitrogen, oxygen, water vapor, and the like are first ionized. These ions are called primary ions. The primary ions move toward the facing electrode 38 due to an electric field. A part of or all the vaporized sample flows from the opening provided in the facing electrode 38 toward the needle electrode 37, and is ionized by the reaction with the primary ions. The needle electrode 37 and the facing electrode 38 are held with an ion-source holder 39. The flow rate of the gas flowing toward the needle electrode 37 is monitored by a flow meter 40. Also, the gas that has passed through the ion source is exhausted outside the mass spectrometer through exhaust tubes 41*a* and 41*b*. In order to control the flow rate of the gas and the pressure of the ion source, exhaust tubes 41*a* and 41*b* may be connected to a suction pump 42.

A voltage of about 1 kV is impressed between the facing electrode 38 and the electrode with an aperture 10*a*, and ions move toward the aperture, and are taken in a differential pumping region through the aperture. Adiabatic expansion occurs in the differential pumping region, and a phenomenon that solvent molecules adhere to ions, known as clustering occurs. In order to reduce clustering, it is desirable to heat the electrodes with apertures 10*a* and 10*b* with heaters. An intermediate electrode 43 may be installed between the electrodes with apertures 10*a* and 10*b* to control the pressure of the differential pumping region.

Although heat spraying, in which the sample solution is sprayed by heat, is described in FIG. 3, electrostatic spraying or gas spraying may be used as the spraying method.

For the quantitative analysis of dioxin, the negative ionizing mode using negative corona discharge is particularly effective. Substances containing halogens, such as dioxin, have characteristics to be negatively ionized easily. Therefore, since halides are preferentially ionized even if impurities are present, the pre-treatment can be simplified to a large extent compared with EI. In the negative ionizing mode, oxygen ions ($O_2^-$) become primary ions. When oxygen ions are previously formed by corona discharge, the oxygen ions react with dioxin molecules to form molecular ions derived from dioxin.

However, nitrogen monoxide (NO) is also formed in corona discharge. Nitrogen monoxide bonds oxygen ions easily. In other words, if much nitrogen monoxide is present in the ion source, the concentration of oxygen ions decreases, and a problem of lowered ionization efficiency arises. Therefore, as FIG. 3 shows, if a gas is supplied to the electrode with an aperture 10*a* side, and flowed toward the needle electrode 37 through the facing electrode 38, the moving direction of ions nearby a tip of the needle electrode is opposite to the moving direction of gas, and the probability of nitrogen monoxide, which has no electric charge, to react with oxygen ions can be lowered. Although nitrogen monoxide and oxygen ions are formed by corona discharge, separation by the presence of electric charge can prevent the reaction of nitrogen monoxide with oxygen ions, and can increase the ionization efficiency of dioxin.

According to the present invention, since dioxins having a large number of chlorine atoms can be analyzed easily with high sensitivity, the quantities of tetrachloro-to octachloro-dioxin or furan can be determined quickly. By obtaining the sum of the quantities of these dioxins, the total quantity of dioxins can be calculated.

In the jet stream formed by nebulization, droplets having a large particle diameter are also contained. Since droplets having a large particle diameter are not vaporized easily, if such droplets are incorporated in the vacuum chamber through the aperture, they reach the detector causing noise and the lowered the S/N ratio of the device, as well as adherence to the needle electrode for contaminating the needle electrode. In the constitution shown in FIG. 3, since nebulization is performed toward the exhaust tube 41*b*, large droplets are exhausted through the exhaust tube 41*b*, and the quantity of droplets incorporated in the vacuum chamber can be decreased. Also, since sufficiently vaporized gas flows toward the needle electrode 37 through the opening of the facing electrode 38, the adherence of large droplets to the needle electrode 37 can be prevented, and the contamination of the needle electrode 37 can be decreased.

Figure 4:
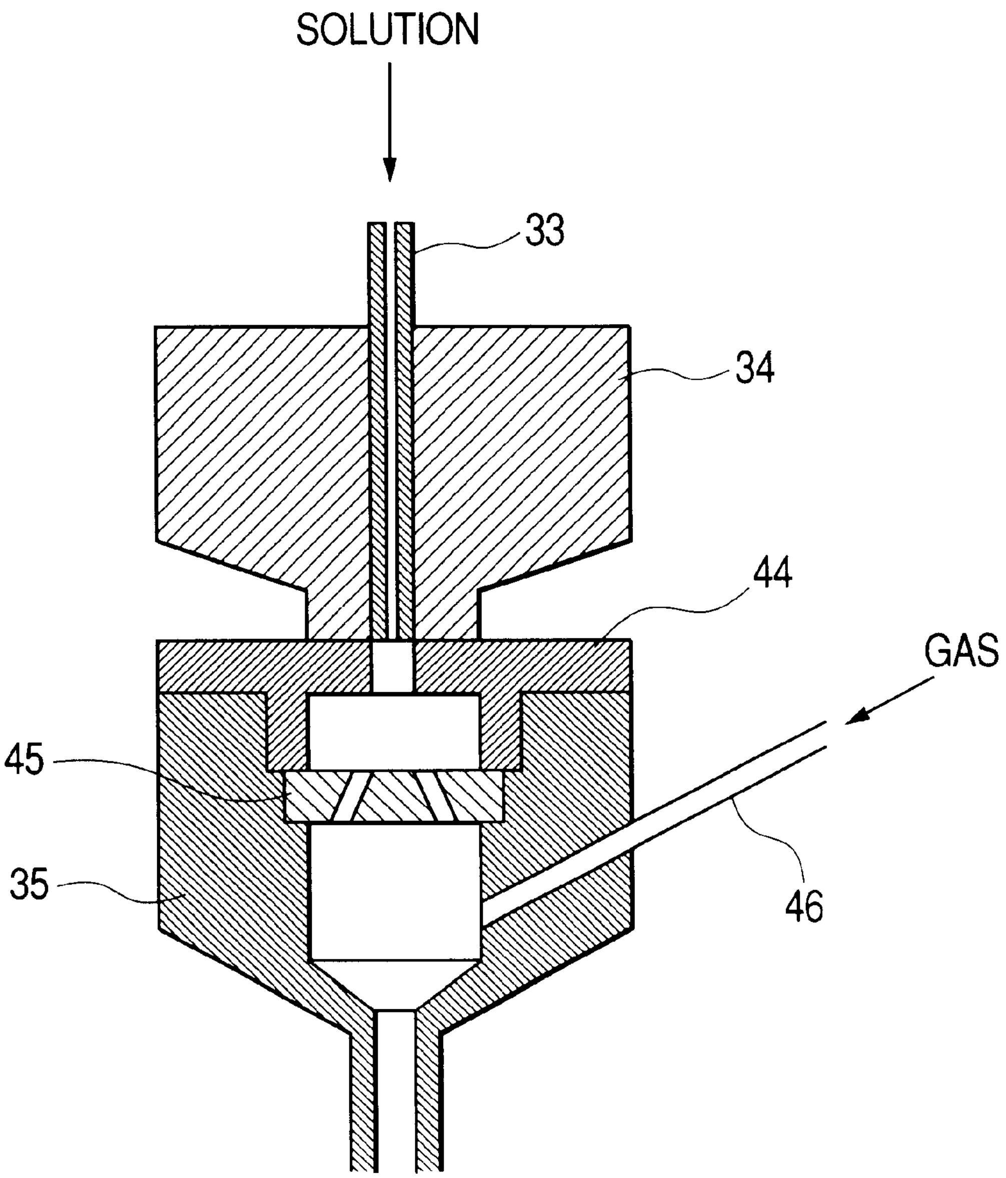
FIG. 4 is a diagram showing a configuration for supplying a gas to the ion source.

FIG. 4 is a further detailed diagram of the portions to nebulize and vaporize the sample solution. Since dioxin is hazardous material, it is preferable to use an airtight gasket 44 between the metal block 34 and vaporizing block 35 so that the sample ejected from the metal pipe 33 does not leak in the laboratory and harm the operators. In order to accelerate the size reduction of the droplets of the sprayed solution, a collision plate 45 may be installed between the metal block 34 and vaporizing block 35 so as to reduce the size of the droplets by making the droplets formed by spraying collide the collision plate 45. Also, in order to control the flow rate of gas flowing into the ion source, a gas supply pipe 46 may be installed in a part of the vaporizing block 35 for supplying the gas.

Figure 5:
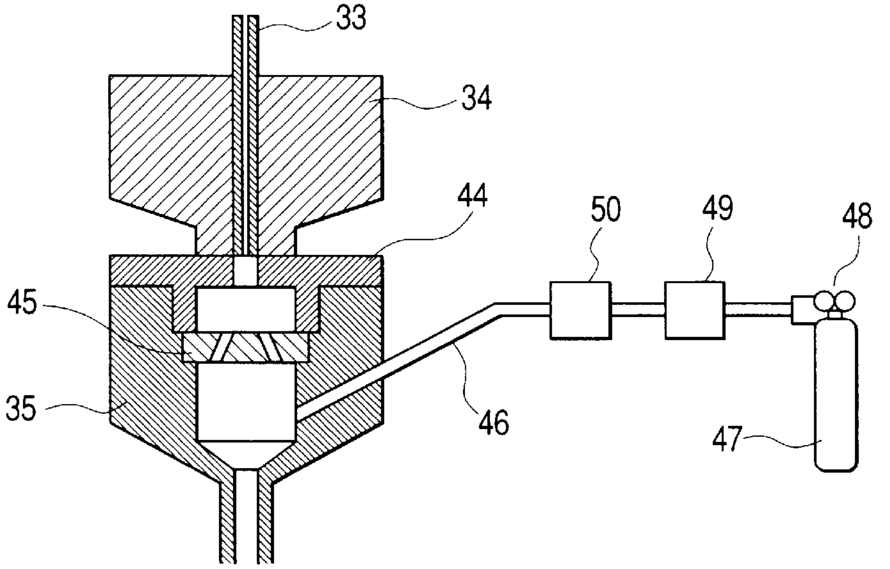
FIG. 5 is a diagram showing a method of supplying a gas to the ion source.

FIG. 5 is a diagram showing an example of a configuration for supplying gas to the vaporizing block 35. The gas from the high-pressure cylinder 47 is transferred through a reducing valve 48, a flow controller 49, and a flow meter 50 to the gas supply pipe 46. The kinds of gas that can be used include dry air, nitrogen, oxygen, argon, and the like. Although dioxin ions are basically formed by the chemical reaction with oxygen ions, the use of dry air is particularly preferable because the use of oxygen may cause discharge to be unstable.

Figure 6:
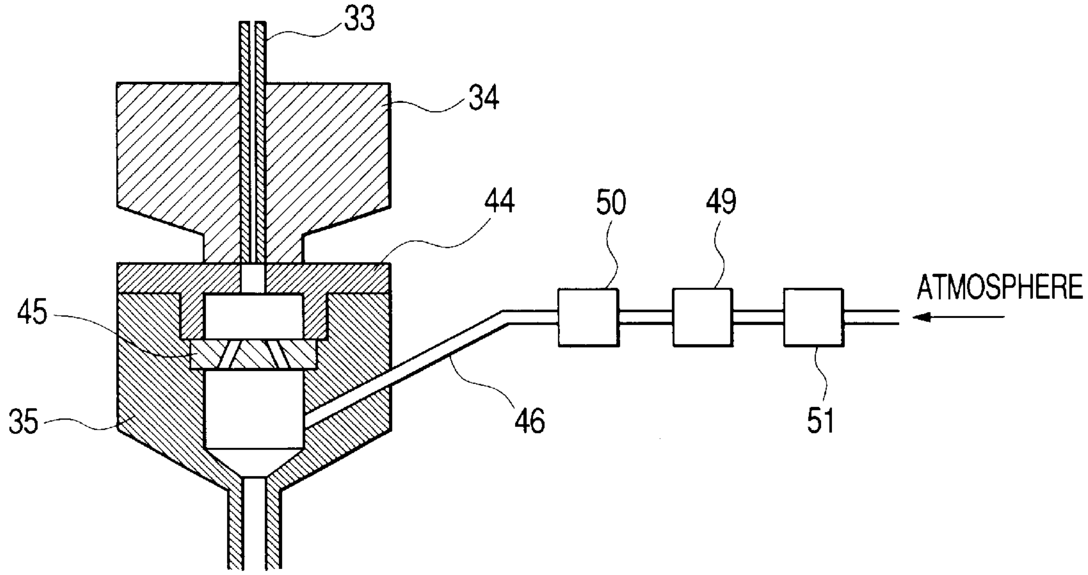
FIG. 6 is a diagram showing another method of supplying a gas to the ion source.

FIG. 6 is a diagram showing another method of supplying gas into the vaporizing block 35. If the procurement of a high-pressure cylinder is difficult, atmospheric air can be sucked and transferred through an air pump 51. When the sucking capacity of the suction pump 42 shown in FIG. 3 is sufficient, the air pump 51 may be omitted, because the suction of the gas by the suction pump 42 can supply the gas into the vaporizing block 35.

Figure 7:
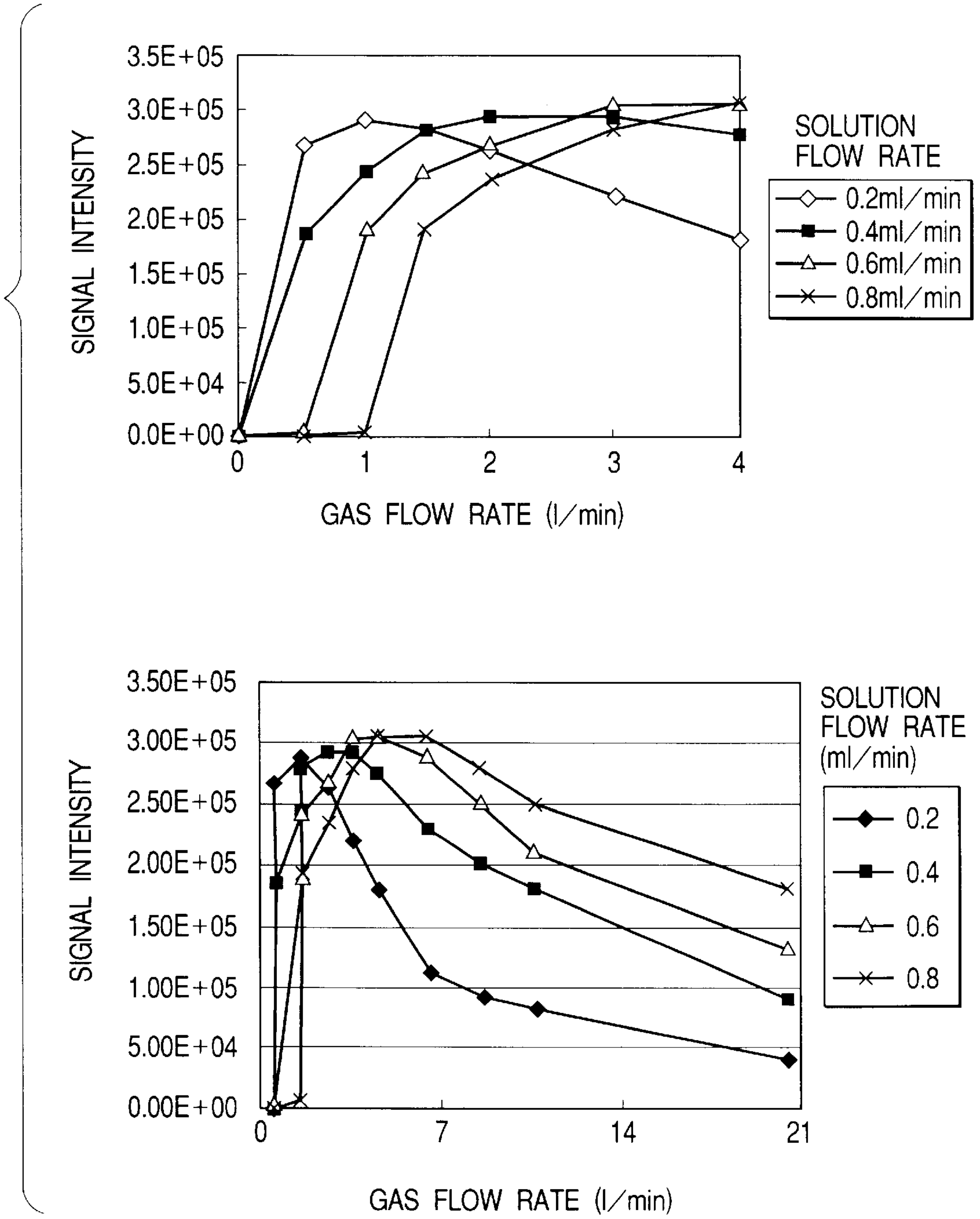
FIG. 7 is a diagram showing a flow rate of the gas supplied to the ion source, and a signal intensity of dioxin in various flow rate of a sample solution.

FIG. 7 is a graphs showing a relationship between gas flow rates and signal intensities for various flow rates of the solution as parameters. The kind of the gas was dry air. Dioxin was dissolved in methanol, adjusted to a concentration of 1 ppm, and introduced into the metal pipe 33 at a constant flow rate. The upper graph of FIG. 7 is a graph in which the full scale of the abscissa is 4 L/min of the gas flow rate, and the lower graph of FIG. 7 is a graph in which the full scale of the abscissa is 21 L/min of the gas flow rate.

From the results shown in FIG. 7, it was found that the signal intensities of dioxin depended on the flow rate of the gas, and the optimal gas flow rate differed corresponding to the flow rates of the solution. For example, when the solution flow rate is 0.2 ml/min, the preferable gas flow rate is about 1 L/min; and when the solution flow rate is 0.6 ml/min, the preferable gas flow rate is about 3 L/min. When a solution is vaporized, the volume is generally expanded to about 1,000 times. In the present experiment, a good result was obtained when the ratio of the flow rate of the gas formed by the vaporization of the solution, to the flow rate of the gas supplied from the gas supply pipe was about 1:5. Therefore, it is important to change the gas flow rate corresponding to the solution flow rate.

As a result of the experiment, when the solvent was methanol, and the temperature in the vicinity of the ion source was 180° C., ions were observed if the gas flow rate was made 1,000 times the solution flow rate or more, and efficient ionization was achieved if the ratio was 1:5,000. If the ratio was higher than 1:5,0000, although the signal intensity lowered gradually, the sample could analyzed up to about 1:100,000.

Figure 11:
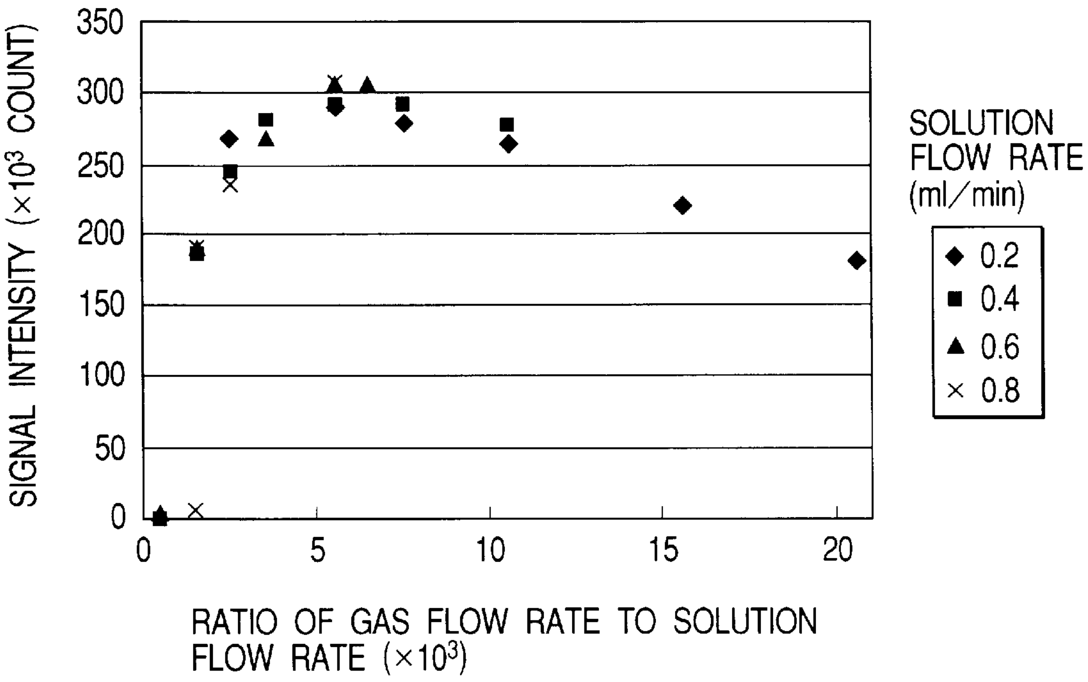
FIG. 11 is a rewritten graph of sample solution flow rates and gas flow rates, and sample solution flow rates and signal intensities, wherein the abscissa indicates the ratio of gas flow rates to solution flow rates, and the ordinate indicates the signal intensities.

FIG. 11 is a graph of solution flow rates vs. gas flow rates and solution flow rates vs. signal intensities shown in FIG. 7 that is rewritten so that the abscissa indicates the ratio of gas flow rates to solution flow rates, and the ordinate indicates signal intensities. In any experiments in which solution flow rates were from 0.2 ml/min to 0.8 ml/min, the ion intensities (signal intensities) rose steeply where the ratio of gas flow rates to solution flow rates was about 2,000, and reached the peaks where the ratio was about 5,000. The ion intensities at rising points were unstable, and signals were not observed in some experiments and the observed ion intensities were fluctuated to some extent. For example, the points where the ion intensities build up observed in FIG. 11 (points at the flow-rate ratio of 1,500–1,900; signal intensities of $150–200\times10^3$ counts) were not observed in some experiments. Including such cases, the ion intensities were stably observed from the points of the flow-rate ratio from 2,500.

Where the flow-rate ratio is between 5,000 and 8,000, the ion intensities are almost constant, and thereafter, the ion intensities attenuate slowly. The ion intensity where the flow-rate ratio is 15,000 is almost equal to the ion intensity where the flow-rate ratio is 2,500. Therefore, it is known that the flow-rate ratio where the ion intensities are stably observed must be in the range between 3,000 and 15,000.

Figure 8:
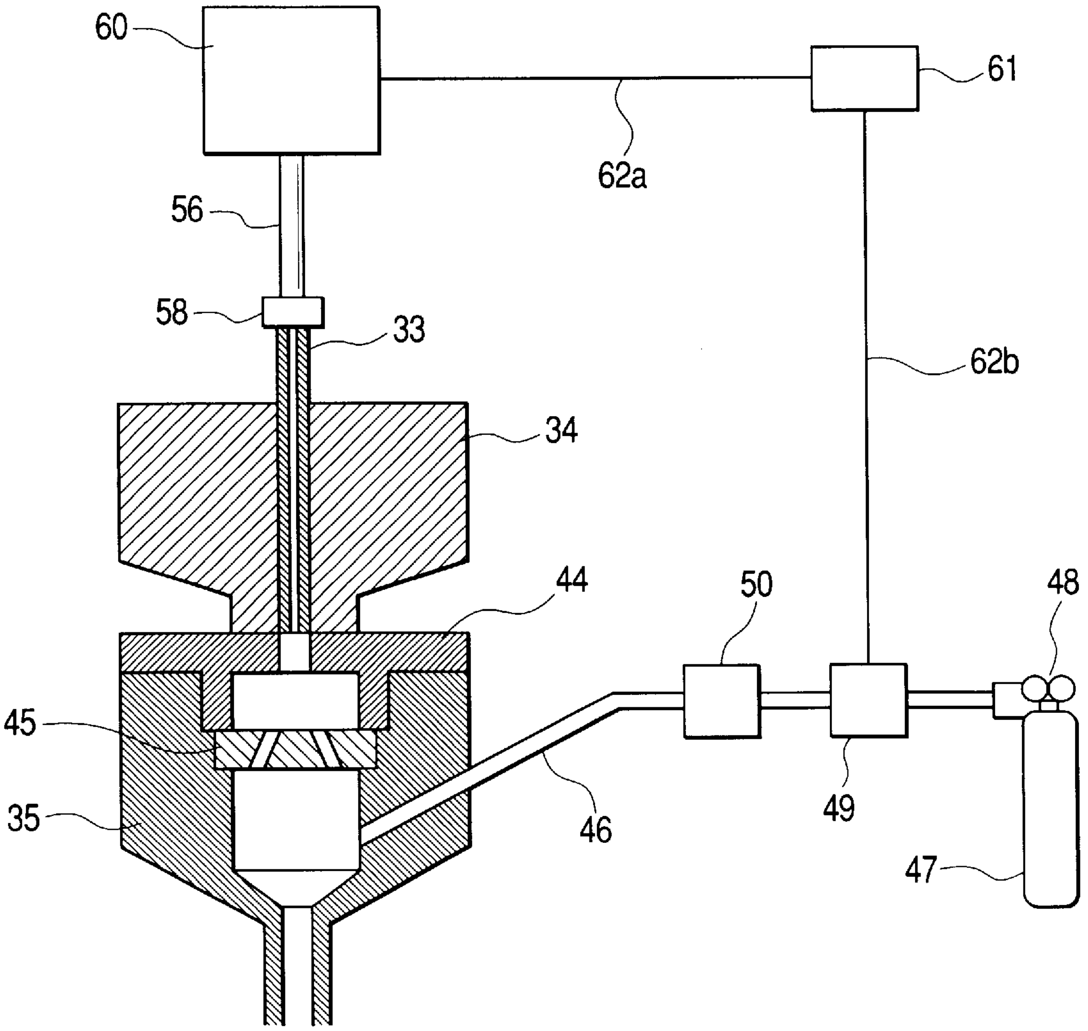
FIG. 8 is a diagram showing a configuration for controlling the flow rate of the gas supplied to the ion source corresponding to the flow rate of the sample solution.

FIG. 8 is a configurating diagram for controlling the flow rate of the gas supplied to the ion source corresponding to the flow rate of the sample solution. The sample solution is introduced into the metal pipe 33 from the pump 60 through the pipe 56 and the connector 58. The information concerning the set flow rate of the pump 60 are transmitted through the signal line 62*a* to the controller 61. The controller 61 determines the optimal gas flow rate under the set solution flow rate conditions, based on the data that have been obtained by experiments, and transmits the information to a flow controller 49 through the signal line 62*b*. The flow controller 49 adjusts the flow rate of the gas introduced to the ion source according to the signal from the controller 61.

According to the present invention, dioxins can be ionized at high efficiency, and the total quantity of dioxins can be measured conveniently. Thereby, the system for monitoring the quantity of dioxins emitted from an incinerator to environment for a long period of time can be constructed easily.

The present invention is effective not only for the measurement of dioxins in exhaust gases, but also for liquid chromatograph/mass spectrometer (hereafter abbreviated as LC/MS) frequently used for the analysis of living-body-related substances.

Figure 9:
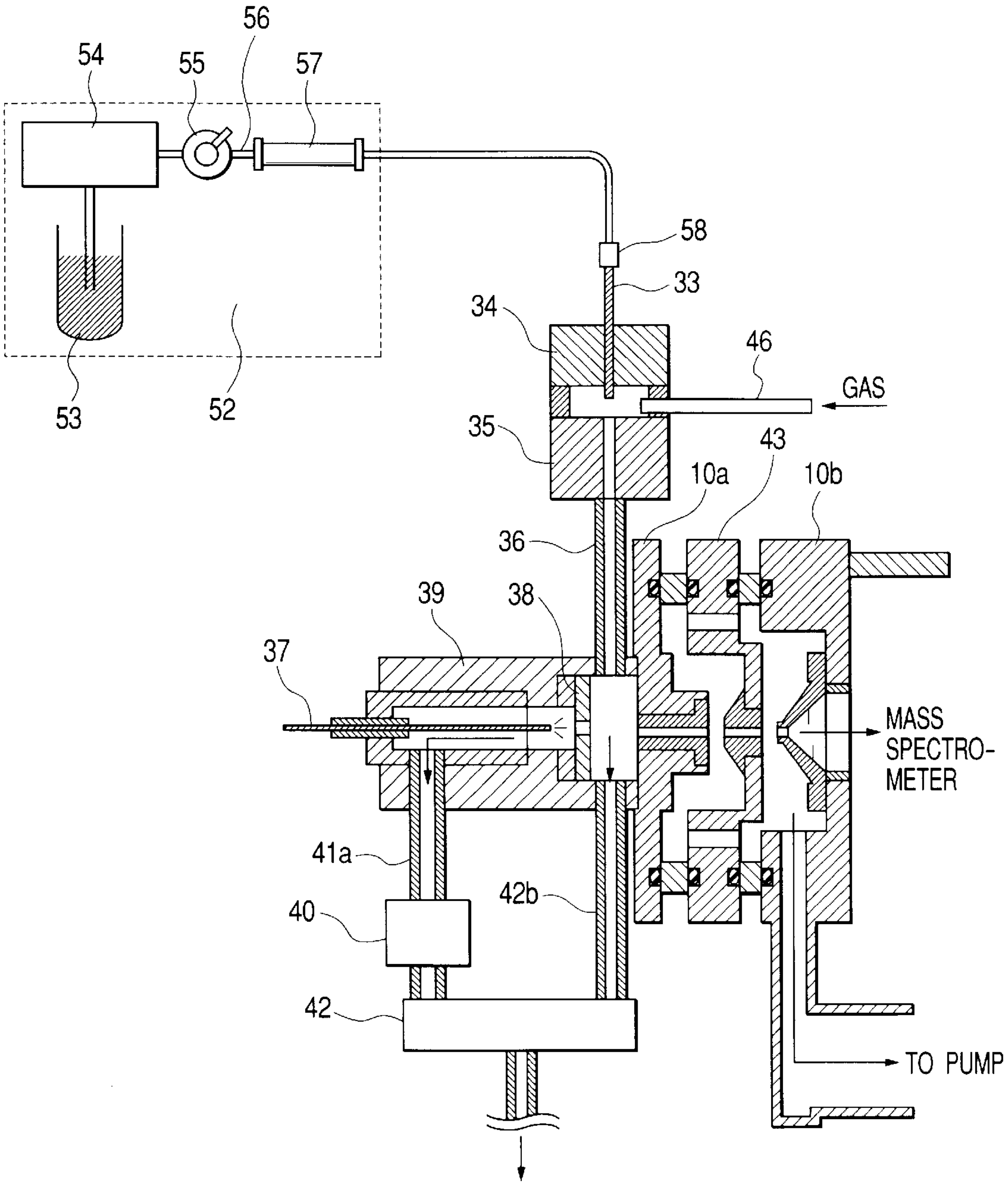
FIG. 9 is a diagram showing a configuration where the present invention is embodied in liquid chromatograph and a mass spectrometer.

FIG. 9 is a diagram when the present invention is applied to LC/MS. A liquid chromatograph 52 is composed of a mobile phase solvent tank 53, a liquid chromatograph pump 54, an injector 55, piping 56, and a separation column 57. The sample solution is injected from the injector 55, and pumped by the liquid chromatograph pump 54 together with a mobile phase solvent to the separation column 57. The separation column 57 is filled with a filler. The sample solution is separated into each component in the separation column 57 by the interaction with the filler. The separated sample is transferred into the metal pipe 33 through the connector 58. The structure shown in FIG. 9 is particularly effective in the negative ionization mode.

Figure 10:
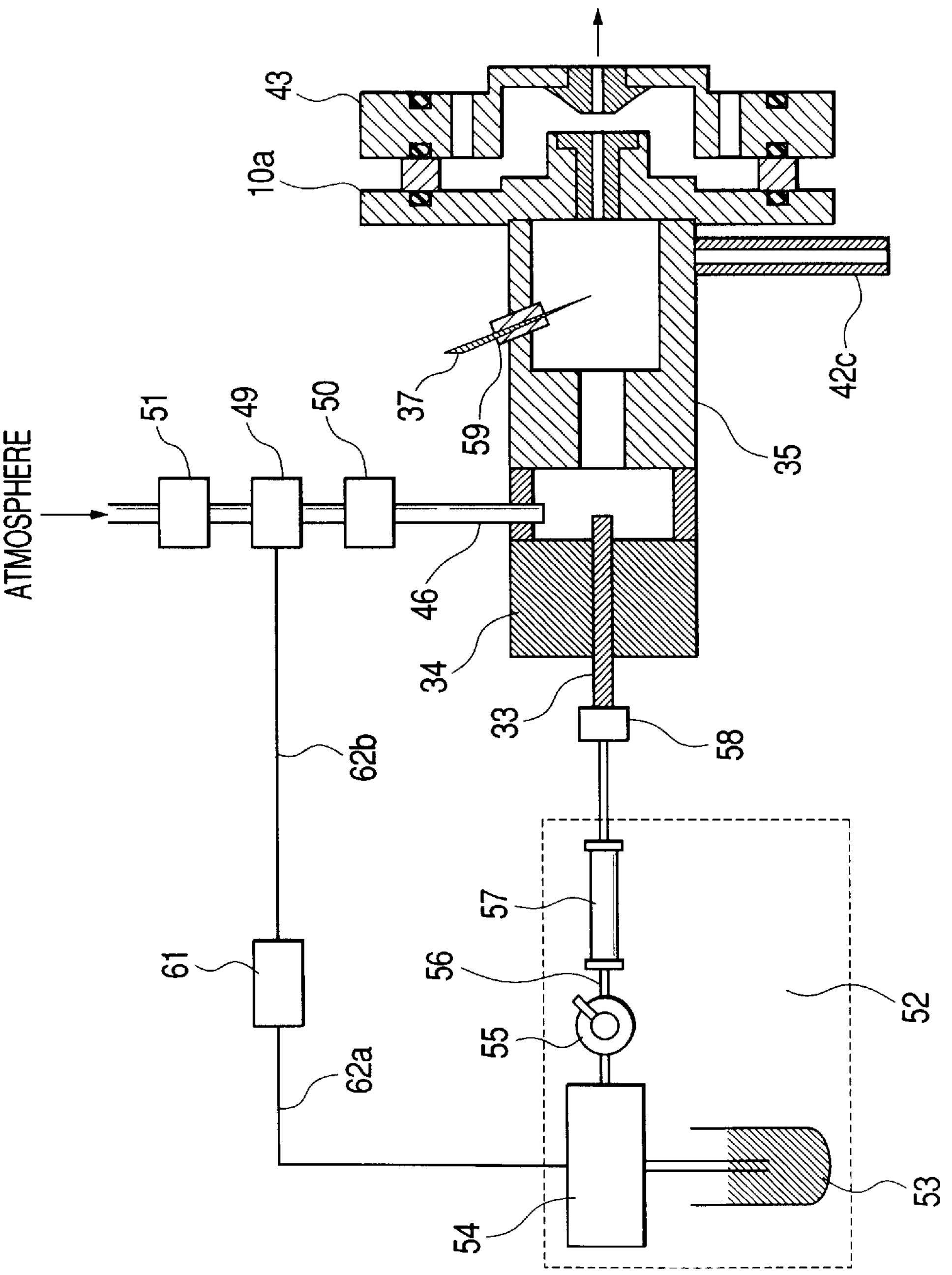
FIG. 10 is a diagram showing another configuration where the present invention is embodied in liquid chromatograph and a mass spectrometer.

FIG. 10 is a diagram showing another embodiment of LC/MS. In particular, in the positive ionization mode for positive ions, it is not always required to supply the gas obtained by evaporating the sample solution to the electrode with the side of an aperture 10*a*, and to flow the gas toward the side of the needle electrode 37 through the facing electrode 38, as FIG. 9 shows. The sample separated in the liquid chromatograph 52 is introduced into the metal pipe 33 and sprayed. The sprayed droplets are evaporated by the evaporating block 35, and introduced into the area where corona discharge occurs by the needle electrode 37. Since a high voltage is impressed on the needle electrode 37, the needle electrode 37 is held by an insulator 59.

The flow rate of the sample solution in a liquid chromatograph is generally 0.1–1 ml/min, but conventional LC/MS has a problem that the sensitivity lowers when the flow rate of the solution lowers. Therefore, in the present invention, a predetermined flow rate of gas is supplied from a gas supply pipe 46 to the jet stream formed by nebulization. As a result of experiments, it was found that almost the same result as the result shown in FIG. 7 was obtained; the signal intensities depend on the flow rate of the gas supplied from the gas supply pipe 46; and the optimal gas flow rates differ corresponding to the solution flow rates. Therefore, by adjusting the flow rate of the gas supplied from the gas supply pipe 46 corresponding to the flow rate of the sample solution in the liquid chromatograph, LC/MS that has a high measurement sensitivity even if the flow rate changes has become possible.

The present invention also provide the following methods of analyzing a sample.

(1) A method of analyzing a sample comprising the steps of: nebulizing the sample solution; mixing a carrier gas to the nebulized sample; vaporizing a sample mixed with the carrier-gas; ionizing the sample by introducing the mixed gas of the vaporized sample and the carrier gas into a discharge chamber wherein corona discharge is generated, and mass-analyzing by introducing the ionized sample into a mass spectrometer.

(2) The method of analyzing a sample according to the above-described (1), wherein the moving direction of the ionized sample moving in the discharge chamber, and the moving direction of the mixed gas of the vaporized sample and the carrier gas are opposite to each other.

According to the present invention, dioxins can be ionized at high efficiency, and as a result, the total quantity of dioxins can be measured easily and conveniently. Thereby, the system for monitoring the quantities of dioxins discharged from an incinerator into environment for a long period of time can be constructed easily. By mixing gas of a flow rate corresponding to the flow rate of the nebulized sample, and supplying the mixture to the ionizing region, the detection sensitivity of the mass spectrometer can be optimized.

What is claimed is:

1. An ion source, comprising:

a nebulizer for nebulizing a sample solution;

a vaporizer for vaporizing a sample nebulized by said nebulizer;

a mixer for mixing a carrier gas with the sample nebulized by said nebulizer or vaporized by said vaporizer; and a discharge chamber having a gas entrance and a gas exit through which said carrier-gas mixed sample flows in and flows out, a needle electrode that generates corona discharge, and an aperture for taking out an ionized sample.

2. The ion source according to claim 1, further comprising a mixing rate controller for controlling a flow rate of the sample solution supplied to said nebulizer, and a mixing rate of the carrier gas supplied to said gas mixer.

3. The ion source according to claim 2, wherein said mixing rate controller controls (the flow rate of the carrier gas)/(the flow rate of the sample solution) to a predetermined value between 2,500 and 15,000.

4. The ion source according to claim 2, wherein said mixing rate controller controls (the flow rate of the carrier gas)/(the flow rate of the sample solution) to a predetermined value between 5,000 and 8,000.

5. The ion source according to claim 1, wherein said gas entrance of said discharge chamber is also used as an aperture for taking out the ionized sample.

6. The ion source according to claim 1, further comprising a flow path for bypassing through said discharge chamber a part of said carrier-gas mixed sample supplied from said gas mixer.

7. A mass spectrometer, comprising:

a nebulizer for nebulizing a sample solution;

a vaporizer for vaporizing a sample nebulized by said nebulizer;

a mixer for mixing a carrier gas with the sample nebulized by said nebulizer or vaporized by said vaporizer;

a discharge chamber having a gas entrance and a gas exit through which said carrier-gas mixed sample flows in and flows out, a needle electrode that generates corona discharge therein, and an aperture for taking out an ionized sample; and a mass analyzer wherein ions taken out of said aperture in said discharge chamber are introduced.

8. The mass spectrometer according to claim 7, further comprising a mixing rate controller for controlling a flow rate of a sample solution supplied to said nebulizer, and a mixing rate of the carrier gas supplied to said gas mixer.

9. The mass spectrometer according to claim 8, wherein said mixing rate controller controls (a flow rate of the carrier gas)/(a flow rate of the sample solution) to a predetermined value between 2,500 and 25,000.

10. The mass spectrometer according to claim 8, wherein said mixing rate controller controls (a flow rate of the carrier gas)/(a flow rate of the sample solution) to a predetermined value between 5,000 and 8,000.

11. The mass spectrometer according to claim 7, wherein said gas entrance of said discharge chamber is also used as an aperture for taking out the ionized sample.

12. The mass spectrometer according to claim 7, further comprising a flow path for bypassing through said discharge chamber a part of said carrier-gas mixed sample supplied from said gas mixer.

* * * * *